United States Patent Office.

P. M. HUFFMAN, OF HARVARD, ILLINOIS.

Letters Patent No. 65,813, dated June 18, 1867.

IMPROVED COUGH MIXTURE.

*The Schedule referred to in these Letters Patent and making part of the same.*

TO WHOM IT MAY CONCERN:

Be it known that I, P. M. HUFFMAN, of Harvard, in the county of McHenry, and State of Illinois, have invented a new and valuable Cough Mixture; and I do hereby declare that the following description will enable any person skilled in the art to understand the manner of compounding the same.

The invention consists in the employment of the following ingredients, mixed together in about the proportions herein mentioned: Compound sirup of squills, ℥ii; laudanum, (*Tincture opii*,) ℥i; sirup of lobelia, (or tincture,) ℥i; oil of anise, ℥i; castor oil, ℥ii; extract of cubeb, ℥i; extract of licorice root, ℥i; balsam tolu, ℥i. These ingredients should be well mixed together; and to the mixture are added sixteen ounces (℥xvi) of honey or sirup of white sugar.

The dose of an adult is fifteen drops or half teaspoonful, taken four or five times a day, or even oftener, if the cough is very troublesome.

The medicinal properties of the several ingredients composing the mixture herein described may be briefly mentioned as follows: Sirup squills is emetic, diaphoretic; it is an expectorant, and sometimes cathartic. Laudanum is used as an antispasmodic and stimulant. Sirup of lobelia is used because of its emetic properties, and for producing copious sweating. The oil of anise is used as a flavor, and for correcting or counteracting nauseating and griping effects. Castor oil is a mild cathartic. The sirup or tincture of cubeb is a gentle stimulant, and is efficacious for producing relief in bronchial inflammation. Sirup of liquorice root is an excellent demulcent, and designed for relieving irritation of the mucous membrane of the bronchia. Balsam of tolu is a stimulant and a tonic. It has an agreeable flavor, and greatly assists expectoration.

What I claim as new, and desire to secure by Letters Patent, is—

A cough mixture which is composed of the several ingredients mixed together in about the proportions specified.

P. M. HUFFMAN.

Witnesses:
    WILLIAM MARSHALL,
    AMMI SUTHERLAND.